3,404,997
MAGNETIC RECORDING MEDIA

Morton J. Jacobson, San Carlos, Calif., assignor to Ampex Corporation, Redwood City, Calif., a corporation of California
No Drawing. Filed May 10, 1965, Ser. No. 454,736
2 Claims. (Cl. 117—62)

ABSTRACT OF THE DISCLOSURE

A magnetic recording medium wherein magnetic particles are imbedded in a resinous binder containing from about 75 to 85% of weight of a partially hydrolyzed copolymer of vinyl chloride and vinyl acetate and from about 15 to 25% by weight of a urea formaldehyde resin.

---

This invention relates to a magnetic recording medium and more particularly to a novel resin binder system for use in a magnetic recording medium wherein a backing material which may be in the form of a tape, belt, disc, card or the like is provided with a synthetic resin binder having finely divided magnetic particles dispersed therein.

Normally, the backing material is a plastic and the invention will be described in conjunction with a plastic backing material although it will be understood that other materials well known to those skilled in the art, such as paper, glass or metal might be used.

Modern tape recorders and reproducers impose severe bending and abrasion stresses on magnetic tape so that the useful life of a tape is often quite limited. Further, certain resin systems are difficult to handle in a plant and have poor dispersibility and short pot life and most resin systems which have been proposed in the past have been thermoplastic systems, primarily since these systems are usually easier to handle on conventional tape manufacturing equipment. Although it has been recognized that thermosetting coatings would be superior to the usual thermoplastic coatings, such systems ordinarily require long reaction times, rendering them impractical for use in conventional manufacturing systems.

It is therefore an object of the present invention to provide a highly stable resin system which has long wear and abrasion resistance when used as a magnetic tape recording.

Another object of this invention is to provide a novel resin system having superior dispersing qualities so that it is easy to disperse magnetic particles therein.

Still another object of this invention is to provide a resin system employing relatively high molecular weight compounds which can be treated as thermoplastic compounds in manufacturing tape and which cross-link to thermosetting compounds upon storage. Thus, after the tape is coated, the solvent can be removed in a normal drying oven and the tape immediately spooled. Final curing can take place while the tape is on the spool.

Other objects and features of the invention will be apparent from the balance of the specification.

In general, the objects of the present invention are accomplished combining two resins, each of which is a high molecular weight thermoplastic resin which contains reactive hydroxyl groups which react on mild heating to produce a partially cross-linked copolymer. One of the resins is a thermoplastic, partially hydrolyzed copolymer of vinyl chloride and vinyl acetate. Suitable copolymers have the following characteristics:

A specific gravity of from 1.37 to 1.38 at 25° C.; a viscosity of 676 cps. at 25° C. as a 23% by weight resin solids solution in a solvent of 4:1 toluene:acetone and a hydroxyl to acetate ratio of 3:1. Due to the high hydroxyl content such resins are highly compatible with other resins. A typical example of such a vinyl chloride-vinyl acetate copolymer is sold under the trade name Geon 440X24. It will be understood that this is only a typical example of such a resin and that many other vinyl chloride-vinyl acetate copolymers may be utilized.

The second component is a urea formaldehyde resin which is a reaction product of urea and formaldehyde under basic conditions. The mono- and dimethylol ureas are thus produced which are esterified by heating with slightly acidified butanol. They have a specific gravity of 1.02 and a viscosity at 25° C. in Gardner-Holdt tubes of L-Q. A typical suitable resin is sold under the trade name Uformite F240, and here again, it must be understood that many other urea formaldehyde resins might be employed.

On a resins-solids basis it is preferred to use from 75% to 85% by weight of the vinyl chloride-vinyl acetate copolymer and from 15% to 25% by weight of the urea formaldehyde resin. As will later appear, various solids and solvents are utilized in making the coatings and the finished coatings will contain about 75% by weight of a magnetic pigment and about 25% by weight of resinous solids and additives.

In formulating practical tapes, ingredients other than the resin binder and the magnetic oxide particles are employed as is well known to those skilled in the art. Thus, antistatic compounds, such as carbon black might be added; fungicides, such as phenylmercuric oleate and dispersants such as lecithin and lubricants such as silicones may be employed. Various solvents are used to disperse the solid ingredients and to act as solvents for the resin components. Normally, a dispersion is first made of gamma ferric oxide, carbon black and solvents as well as any desired additives. After this dispersion has been prepared, a separate resin solution is then prepared and the resin solution is added to the dispersion and mixed as in a ball mill for from six to thirty-six hours. The final dispersion thus produced is then applied to a plastic backing material utilizing typical tape coating techniques. The backing material may be a plastic such as Mylar (a polyethylene terephthalate) cellulose acetate, polypropylene, paper, metal, or the like. After the tape is coated, the wet coating is dried in a three-zone oven at 175° F. for the first zone and 225° F. for the second and third zones. The coating speed is 120 feet per minute, and the total residence time is 35 to 40 seconds. The tape is immediately reeled. The reel can then be stored in a warm atmosphere to cause the final cross-linking. Storage for 24 hours at 80° C. or 4 hours at 100° C. has been found adequate to bring about the desired cross-linking.

The following nonlimiting examples illustrate various embodiments of the invention (all parts are by weight):

|  | Example No. | | | |
| --- | --- | --- | --- | --- |
|  | 1 | 2 | 3 | 4 |
| Dispersion: | | | | |
| Magnetic oxide | 70.0 | 70.0 | 70.0 | 70.0 |
| Carbon black | 7.3 | 7.3 | 7.3 | 7.3 |
| Additives [1] | 13.1 | 13.1 | 13.1 | 13.1 |
| Methyl ethyl ketone | 12.1 | 12.1 | 12.1 | 12.1 |
| Toluene | 48.3 | 48.3 | 48.3 | 48.3 |
| Resin solutions added to the above dispersions: | | | | |
| Geon 440X24 Cl | 14.97 | 19.6 | 14.0 | 13.1 |
| Uformite F240 (60% solids) | 4.4 | 5.8 | 5.8 | 7.3 |
| Toluene | 47.1 | 50.9 | 46.5 | 45.9 |
| Methyl ethyl ketone | 12.0 | 13.3 | 12.0 | 12.0 |
| Avg. rs. sp. gravity | 1.18 | 1.18 | 1.18 | 1.18 |
| Total solvent blend toluene: MEK | 4:1 | 4:1 | 4:1 | 4:1 |
| Weight percent resin solids | 17.6 | 21.9 | 18.0 | 18.4 |
| PVC (percent) | 50 | 45 | 50 | 50 |
| Geon/Uformite | 85:15 | 85:15 | 80:20 | 75:25 |
| Digital output at 800 BPI percent of IBM Std | +4 | +2 | | |
| Resistance | Less than $10^3$ ohms per square. | | | |
| Chemical resistance | Improved from standard thermoplastic tapes. | | | |
| Temperature stability | Greater than the polyester substrate. | | | |

[1] Additives include lecithin, silicone oil, phenylmercuric oleatic and tribasic lead phosphite.

I claim:
1. A magnetic recording medium comprising a nonmagnetic backing material and an adherent coating thereon, said coating comprising finely divided magnetic particles dispersed in a resinous binder, said binder comprising from 75 to 85% by weight of a partially hydrolyzed copolymer of vinyl chloride and vinyl acetate having a hydroxyl to acetate ratio of about 3 to 1 and from 15 to 25% by weight of an urea formaldehyde resin.

2. The method of making a magnetic recording medium comprising preparing a dispersion of a solvent, finely divided magnetic particles and a resin mixture, said resin mixture comprising from 75 to 85% by weight of a partially hydrolyzed copolymer of vinyl chloride and vinyl acetate having a hydroxyl to acetate ratio of about 3 to 1 and from 15 to 25% by weight of an urea formaldehyde resin, coating a plastic tape with said dispersion, evaporating the solvent from the thus coated tape to produce a dispersion of magnetic particles in a solid thermoplastic resin, reeling the tape and curing the reeled tape to produce a thermoset coating on said tape.

References Cited
UNITED STATES PATENTS

| 2,433,062 | 12/1947 | Pfeffer | 260—847 |
| 2,860,801 | 11/1958 | Nielsen | 215—1 |
| 2,914,480 | 11/1959 | Hagopian | 252—62.54 |
| 3,024,216 | 3/1962 | Smitmans et al. | 260—859 |
| 3,144,353 | 8/1964 | Hargis et al. | 117—138.8 |
| 3,216,846 | 11/1965 | Hendricx et al. | 117—62 |
| 3,320,090 | 5/1967 | Graubart | 117—161 |

WILLIAM D. MARTIN, *Primary Examiner.*

B. PIANALTE, *Assistant Examiner.*